United States Patent Office 3,429,690
Patented Feb. 25, 1969

3,429,690
HERBICIDAL α-HALO-N-CYCLOHEXYL-
ACETAMIDES
John F. Olin, Ballwin, Mo., assignor to Monsanto Company, St. Louis, Mo., a corporation of Delaware
No Drawing. Original application Sept. 18, 1964, Ser. No. 397,655, now Patent No. 3,356,724, dated Dec. 5, 1967. Divided and this application Apr. 28, 1967, Ser. No. 647,275
U.S. Cl. 71—118                 8 Claims
Int. Cl. A01n 9/20

ABSTRACT OF THE DISCLOSURE

Herbicidal compositions containing as an active ingredient N-(2'-tert-butyl-6'-methylcyclohexyl)-2-chloroacetamide.

---

This application is a division of copending application Ser. No. 397,655, filed Sept. 18, 1964, now Patent No. 3,356,724, which in turn is a continuation-in-part of application Ser. No. 134,168, filed Aug. 28, 1961, now abandoned.

This invention relates to the control of plant systems, including germinating seeds and emerging seedlings. In one aspect, this invention relates to valuable herbicidal compositions. In another aspect, this invention relates to methods for destroying undesirable plant vegetation without substantially affecting desirable plant vegetation. In another aspect, this invention relates to methods for preventing the germination of seeds of undesirable plants and for preventing the growth of emerging seedlings of said plants. In another aspect, this invention relates to certain substituted alpha-halo-N-cyclohexylacetamides as new compounds.

In recent years, the use of chemicals for affecting plant systems has found wide-spread acceptance among agriculturalists. For example, chemical compositions have been applied to fully developed vegetation to destroy the same in either a selective or non-selective manner. It is relatively easy to destroy the aerial portion of developed vegetation because the vegetation is brought into direct contact with the herbicide composition; however, it is sometimes more difficult to achieve a lethal effect on germinating seeds lying in the soil and seedlings emerging from the soil. Destruction of germinating seeds and emerging seedlings is important in preventing regrowth from the plants after the herbicide composition has either been washed away by rainfall or dissipated by other actions. Unfortunately, it is usually necessary to use an excessive amount of the herbicidal composition in order to affect the germinating seeds and emerging seedlings and thereby achieve long-lasting plant control. The extended control of plant life during the growth of desirable plants is very often involved in preventing the growth of certain undesirable grasses and weeds, such as crab grass and foxtail. Obviously, a more bountiful growth of desirable grasses and crop plants will result if growth of these undesirable weeds and grasses is prevented before the soil is depleted of moisture and nutrients.

I have discovered, much to my surprise, that the alpha-haloacetamides having a cyclohexyl substituent on the amide nitrogen atom are very effective herbicides, having high unit activities and wide plant spectrums.

An object of this invention is to provide novel herbicidal compositions containing as an essential ingredient an alpha-haloacetamide having a cyclohexyl substituent on the amide nitrogen atom.

Another object of this invention is to provide novel herbicidal compositions having high unit activity for certain plant species.

Another object of this invention is to provide novel herbicidal compositions which exhibit selectivity in affecting certain undesirable plant systems without affecting desirable plant systems.

Another object of this invention is to provide methods for the suppression and control of vegetation.

Another object of this invention is to provide methods for the suppression and control of undesirable vegetation growing inter-mingled with desirable vegetation.

Another object of this invention is to provide methods for preventing the germination of seeds of undesirable plants and for preventing the growth of undesirable emerging seedlings in soil which is planted with seeds of desirable vegetation.

Another object of this invention is to provide as new compounds certain alpha-haloacetamides having a cyclohexyl substituent on the amide nitrogen atom.

Other aspects, objects, and advantages of this invention will be apparent from a consideration of the accompanying disclosure and the appended claims.

According to the present invention, there are provided herbicidal concentrate compositions comprising a herbicide adjuvant and an alpha-haloacetamide of the formula

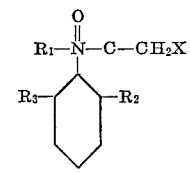

wherein $R_1$, $R_2$ and $R_3$ are each selected from the group consisting of hydrogen and alkyl, at least one of said $R_1$, $R_2$ and $R_3$ is an alkyl radical, and X is a halogen atom selected from the group consisting of chlorine, bromine and iodine.

Also, according to the present invention, there are provided herbicidal compositions comprising a carrier, a herbicide adjuvant and a toxic or growth-inhibiting amount of an alpha-haloacetamide of the formula as described above.

Also, according to the present invention, there are provided methods for affecting plant systems, i.e., germinating seeds and emerging plant seedlings, in a manner to prevent the growth of said seeds and said emerging seedlings by the application of a toxic or growth-inhibiting amount of an alpha-haloacetamide of the formula as described above.

Further, according to the present invention, there are provided, as new compounds, alpha-haloacetamides of the formula as described above.

The alpha-haloacetamides of this invention have a cyclohexyl substituent substituted on the amide nitrogen atom. The amide nitrogen atom may also be substituted with an alkyl radical, $R_1$ in the formula above. The cyclohexyl substituent may also be substituted, $R_2$ and $R_3$ in the formula above, in one or both ortho positions with respect to the amide nitrogen atom. These alkyl radicals, as represented by $R_1$, $R_2$ and $R_3$, may have either a straight-chain or a branch-chain configuration, including secondary and tertiary alkyl groups. Preferably, each alkyl radical has not more than 8 carbon atoms. Examples of suitable alkyl radicals include methyl, ethyl, isopropyl, n-butyl, sec-butyl, tert-butyl, tert-amyl, n-heptyl, and the like. The $R_1$, $R_2$ and $R_3$ substituents may each be the same or different provided at least one of said substituents is an alkyl radical.

The halogen substituent on the alpha-carbon atom of the haloacetamide, identified by X in the formula above, may be either a chlorine, bromine, or iodine atom.

The alpha-haloacetamides of this invention may in general be prepared by haloacetylation of suitable ortho-substituted and/or N-substituted cyclohexylamines, which may be prepared for example, by hydrogenating the corresponding aromatic amines prepared by the processes disclosed in applications S.N. 824,455 and 824,488, filed July 2, 1959, now both abandoned, from a primary aromatic amine and a branch-chain olefin. The hydrogenation may be performed using a hydrogenation catalyst such as platinum or rhodium supported on alumina at a temperature in the range of 100–200° C, and super-atmospheric pressure in the range of 500 to 5,000 p.s.i. The haloacetylating agent is preferably either a haloacetic anhydride, such as chloroacetic anhydride, or a haloacetyl halide, such as chloroacetyl chloride, bromoacetyl bromide, or the like.

The haloacetylation reaction is preferably conducted in the presence of a suitable liquid reaction medium. The liquid reaction medium must be anhydrous if the acetylating agent is a haloacetic anhydride; however, either anhydrous reaction mediums or mediums containing water can be used with haloacetyl halide acetylating agents. Examples of some suitable reaction mediums for use with either acetylating agent include benzene, diethyl ether, hexane, methylethyl ketone, chlorobenzene, toluene, chloroform, and the xylenes. Since an acid or hydrogen halide is eliminated in the halo acetylation reaction, it is also desirable to have an acid acceptor present in the reaction zone to neutralize the acid formed. Suitable acid acceptors for anhydrous solvent systems, include the cyclohexylamine reactants, which may be present in the reaction zone in an amount greater than that required for the acetylation, tertiary amines and pyridine. Acid acceptors in aqueous solvent systems include alkali or alkaline earth hydroxides and alkali or alkaline earth metal carbontes or bicarbonates.

The haloacetylation reaction is generally carried out at a temperature which is below room temperature, preferably in the range of from 0° C. to 15° C. It is not usually desirable to carry out the reaction at a temperature above room temperature because hydrolysis of the haloacetyl halide takes place and the reaction rate is excessively high. It is generally preferable to carry out the reaction at atmospheric pressure although sub-atmospheric pressure and super-atmospheric pressure can be used. Although the haloacetylation reaction can be carried out using stoichiometric amounts of reactants, it is usually preferable to use from 2 to 5% of an excess of the acetylating agent. The haloacetamide products may be separated from the reaction mixture by methods well known to those skilled in the art, such as by distillation or by fractional crystallization from the reaction medium or from solvents in case the desired product is a soluble substance.

The advantages, desirability and usefulness of the present invention are illustrated by the following examples.

Example 1

In this example, N-tert-butyl-2-chloro-N-cyclohexylacetamide was prepared from N-tert-butyl-cyclohexylamine and chloroacetyl chloride. Into a 2-liter reaction flask were placed 46.5 g. (0.3 mole) of N-tert-butylcyclohexylamine, 42 g. of potassium carbonate, 100 ml. of water, 400 g. of ice, 300 ml. of benzene and 100 ml. of diethyl ether. Thereafter, 39.5 g. (0.35 mole) of chloroacetyl chloride in 50 ml. of benzene was added to the reaction flask with stirring over a period of 33 minutes while keeping the temperature at −4° C. to +2° C. Upon completion of the addition of the chloroacetyl chloride, the reaction mixture was stirred for an additional 10 minutes. At the end of this time, the oil layer was separated, washed with water, and evaporated overnight under a hood. The yellow oil obtained was distilled to obtain 45 g. of N-tert-butyl-2-chloro-N-cyclohexyl- acetamide which is a pale straw colored liquid having a boiling point of 123–125° C./0.5 mm. Hg and refractive index $n_D^{25}$ 1.4943. Analysis of this product was found to be 15.66% chlorine as compared with the calculated value of 15.30% chlorine.

Example 2

In this example, N-(2′-tert-butylcyclohexyl)-2-chloroacetamide was prepared from 2-tert-butylcyclohexylamine and chloroacetyl chloride. Into a 2-liter reaction flask were placed 27 g. of 2-tert-butylcyclohexylamine, 28 g. of potassium carbonate, 100 ml. of water, 400 g. of ice, 200 ml. of benzene, and 100 ml. of diethyl ether. Thereafter, 22.6 g. of chloroacetyl chloride in 25 ml. of benzene was added to the reaction flask with stirring over a period of 30 minutes. At the end of this time, the oil layer was removed, washed with water, and evaporated under a hood overnight to remove the solvents. The residue obtained was cut back with benzene, heated to boiling, and filtered. The filtrate obtained was diluted with hexane and cooled to effect crystallization of the product and obtain 29 g. of the N-(2′-tert-butylcyclohexyl) - 2 - chloroacetamide which is a colorless solid material having a melting point of 94–97° C. Analysis of this product was found to be 15.72% chlorine as compared with the calculated value of 15.30% chlorine.

Example 3

In this example, N-(2′-tert-butyl-6′-methylcyclohexyl)-2-chloroacetamide was prepared from 2-tert-butyl-6-methylcyclohexylamine and chloroacetyl chloride. Into a reaction flask were placed 51 g. of 2-tert-butyl-6-methylcyclohexylamine, 42 g. of potassium carbonate, 100 ml. of water, 400 g. of ice, 300 ml. of benzene and 100 ml. of diethyl ether. Thereafter, 39.5 g. (0.35 mole) of chloroacetyl chloride in 50 ml. of benzene was added slowly with stirring over a period of 33 minutes while maintaining the temperature at −4° C. to +2° C. Upon the completion of the addition of the chloroacetyl chloride, the reaction mixture was stirred for an additional 10 minutes. At the end of this time, the oil layer was separated, washed with water, and evaporated overnight under a hood to remove the solvents. The solid material in the residue was separated by filtration, dissolved in hot benzene, diluted with hexane and cooled to effect crystallization. From the crystallization there was obtained 58 g. of the N-(2′-tert-butyl-6′-methylcyclohexyl)-2-chloroacetamide which is a colorless solid material having a melting point of 95–106° C. Analysis of this product was found to be 14.68% chlorine as compared with the calculated value of 14.43% chlorine.

Example 4

In this example, N-(2′-tert-butyl-6′-ethylcyclohexyl)-2-chloroacetamide was prepared from 2-tert-butyl-6-ethylcyclohexylamine and chloroacetyl chloride. Into a reaction flask were placed 46 g. (0.25 mole) of the 2-tert-butyl-6-ethylcyclohexylamine dissolved in 150 g. of heptane. After heating this mixture to boiling, 30 g. of chloroacetyl chloride was added over a period of 5 minutes and the reaction mixture gently refluxed overnight. At the end of this time, the reaction mixture was filtered and cooled to effect crystallization of the product. The product recovered was recrystallized from dilute methanol to obtain 39 g. of the N-(2′-tert-butyl-6′-ethylcyclohexyl)-2-chloroacetamide which is a gray-white colored solid material having a melting point of 113–122° C. Analysis of this product was found to be 14.15% chlorine as compared with the calculated value of 13.65% chlorine.

Example 5

In this example, 2-bromo-N-(2′-tert-butyl-6′-ethylcyclohexyl)acetamide was prepared from 2-tert-butyl-6-ethylcyclohexylamine and bromoacetyl bromide. Into a reaction flask were placed 20 g. of 2-tert-butyl-6-ethylcyclohexylamine, 12 g. of potassium carbonate, 100 g. of water, and 100 g. of benzene. Thereafter, 20.5 g. of bromoacetyl bromide was added to the reaction flask with stirring over a period of time of 15 minutes while maintaining the temperature at 5 to 14° C. Upon completion of the addition of the bromoacetyl bromide, the reaction mixture was stirred for an additional 10 minutes. At the end of this time, the reaction mixture was washed with water, then with dilute hydrochloric acid, and finally with water. The reaction mixture was then evaporated under a hood and the solid white residue obtained taken up in hot heptane. The heptane solution was cooled to effect crystallization of the product and obtain 70.5 g. of the 2-bromo-N-(2'-tert-butyl-6'-ethylcyclohexyl)acetamide which is a white solid material having a melting point of 127–134° C. Analysis of the product was found to be 26.36% bromine as compared with the calculated value of 26.26% bromine.

Example 6

In this example, the pre-emergent herbicidal ratings of some of the alpha-halo-N-cyclohexylacetamides of this invention were determined in greenhouse tests in which a specific number of seeds of 12 different plants, each representing a principal botanical type, were planted in greenhouse flats. A good grade of top soil was placed in either 9½″ x 5¾″ x 2¾″ or 9″ x 13″ x 2″ aluminum pans and compacted to a depth of ⅜ inch from the top of the pan. On top of the soil were placed five seeds of each of radish, morning glory, and tomato; 10 seeds of each of sugar beet, sorghum, and brome grass; 20 seeds of each of wild buckwheat, giant foxtail, rye grass, and wild oat; approximately 20 to 30 (a volume measure) of each of pigweed and crab grass; and either 2 or 3 seeds of soybean. Two different type plantings were made; one wherein the herbicidal composition was applied to the surface of the soil and the other wherein the composition was admixed with or incorporated in the top layer of soil. In the surface-application plantings, the seeds were arranged with 3 soybean seeds across the center of the large aluminum pan, the monocotyledon or grass seeds scattered randomly over one-third of the soil surface, and the dicotyledon or broadleaf seeds scattered randomly over the remaining one-third of the soil surface at the other end of the pan. The seeds were then covered with ⅜ inch of prepared soil mixture and the pan leveled. In the soil-incorporation plantings, 450 g. of prepared soil mixture was blended with the herbicide composition in a separate mixing container for covering the seeds which were planted in the smaller of the two aluminum pans. The seeds in this planting were arranged with a soybean seed planted in diagonal corners and the monocotyledon seeds and the dicotyledon seeds each scattered randomly over one-half of the soil surface. The herbicide-incorporated soil mixture was used to cover the seeds. The herbicide composition was applied in the surface-application plantings prior to the watering of the seeds. This application of the herbicide composition was made by spraying the surface of the soil with an acetone solution containing a sufficient quantity of the candidate chemical to obtain the desired rate per acre on the soil surface. The watering of the seeds in both type plantings was accomplished by placing the aluminum pans in a sand bench having ½ inch depth of water thereon and permitting the soil in the pans to absorb moisture through the perforated bottom of the pans.

The planted pans were thereafter placed on a wet sand bench in a greenhouse and maintained there for 12 days under ordinary conditions of sunlight and watering. At the end of this time, the plants were observed and the results recorded by counting the number of plants of each species which germinated and grew. The herbicidal rating was obtained by means of a fixed scale based on the average percent germination of each seed lot. The herbicidal ratings are defined as follows:

0—No phototoxicity
1—Slight phytotoxicity
2—Moderate phytotoxicity
3—Severe phytotoxicity The pre-emergent herbicidal activity of some of the substituted 2-halo-N-cyclohexylacetamides of this invention are recorded in Table I for various application rates of the α-haloacetamide in both surface and soil incorporated applications. In Table I, the various seeds are represented by letters as follows:

A—General grass
B—General broadleaf
C—Morning glory
D—Wild oats
E—Brome grass
F—Rye grass
G—Radish
H—Sugar beet
I—Foxtail
J—Crab grass
K—Pigweed
L—Soybean
M—Wild buckwheat
N—Tomato
O—Sorghum Individual ratings for each plant type are reported in Table I. In addition, the total injury rating for all grass plants and the total injury rating for all broadleaf plants are also reported in Table I. For grasses, the maximum total is 18 for the 6 grass plants at ratings of 3. For broadleafs, the maximum total is 21 for the 7 broadleaf plants at ratings of 3.

TABLE I.—PRE-EMERGENCE HERBICIDAL ACTIVITY OF THE SUBSTITUTED α-HALO-N-CYCLOHEXYLACETAMIDES

| Compound | Rate, lb./acre | A | B | C | D | E | F | G | H | I | J | K | L | M | N | O | Grass | Broadleaf | Comments |
|---|---|---|---|---|---|---|---|---|---|---|---|---|---|---|---|---|---|---|---|
| N-tert-butyl-2-chloro-N-cyclohexylacetamide | 25 | 3 | 1 | 0 | 3 | 3 | 3 | 0 | 0 | 3 | 3 | 3 | 0 | 3 | 0 | 1 | 16 | 6 | (¹) |
|  | 5 | 3 | 0 | 1 | 2 | 1 | 3 | 1 | 0 | 3 | 3 | 2 | - | 0 | 0 | 3 | 15 | ³4 | (²) |
| N-(2'-tert-butylcyclohexyl)-2-chloroacetamide | 25 | 3 | 0 | 1 | 3 | 3 | 3 | 0 | 0 | 3 | 3 | 3 | 0 | 0 | 0 | 3 | 18 | 4 | (¹) |
|  | 5 | 3 | 0 | 1 | 3 | 3 | 3 | 0 | 1 | 3 | 3 | 2 | - | 0 | 0 | 3 | 18 | ³4 | (²) |
|  | 1 | 2 | 0 | 0 | 1 | 1 | 2 | 0 | 0 | 3 | 3 | 0 | 0 | - | 0 | 1 | 11 | ³0 | (²) |
| N-(2'-tert-butyl-6'-methylcyclohexyl)-2-chloroacetamide | 25 | 3 | 2 | 2 | 3 | 3 | 3 | 1 | 2 | 3 | 3 | 3 | 2 | 3 | 0 | 3 | 18 | 13 | (¹) |
|  | 1 | 3 | 0 | 0 | 3 | 3 | 3 | 0 | 0 | 3 | 3 | 1 | 0 | 0 | 0 | 0 | 15 | 1 | (²) |
| N-(2'-tert-butyl-6'-ethylcyclohexyl)-2-chloroacetamide | 5 | 3 | 0 | 0 | 3 | 0 | 3 | 0 | 0 | 3 | 3 | 0 | 0 | 0 | 0 | 3 | 15 | 0 | (¹) |
| 2-bromo-N-(2'-tert-butyl-6'-ethylcyclohexyl) acetamide | 5 | 3 | 1 | 0 | 3 | 3 | 3 | 0 | 1 | 3 | 3 | 3 | 1 | 2 | 0 | 3 | 18 | 7 | (¹) |
|  | 1 | 3 | 0 | 0 | 3 | 3 | 3 | 0 | 0 | 2 | 1 | 1 | 0 | 0 | 0 | 3 | 15 | 1 | (²) |

¹ Surface application.  ² Incorporated in soil.  ³ One species missing.

The data in Table I illustrate primarily the selective herbicidal activity but also the general herbicidal activity of some of the substituted α-halo-N-cyclohexylacetamides of this invention. It will be noted that haloacetamides substituted with either an alkyl group on the amide nitrogen atom or an alkyl group or groups substituted on one or both of the positions ortho to the amide nitrogen atom demonstrate very outstanding selective herbicidal activity at low rates of application. It will also be noted from the data in Table I that general herbicidal activity can be obtained at the higher levels of application. The grass specificity is achieved at extremely low application rates, for example, at rates as low as 1.0 lb. per acre with 2-bromo-N-(2'-tert-butyl-6'-ethylcyclohexyl) - acetamide, so that very economical treatment is possible. The three botanical types or genera of grasses effectively controlled by the substituted α-halo-N-cyclohexylacetamides of this invention embrace a large number of undesirable plants, or weeds, frequently found in vegetable crops. But these α-haloacetamides are not limited to removing grasses from broadleaf plants, since the selective action is such that certain genera of grasses can be removed from corn, which is also a genus of grass. These α-halo-N-cyclohexylacetamides are also effective in killing nut grass, i.e., *Cyperus rotundus* and *Cyperus esculentus*.

Example 7

In this example, the lack of herbicidal activity of closely related compounds which do not have the structure of the substituted α-halo-N-cyclohexylacetamides of this invention is demonstrated. Pre-emergent greenhouse tests were used in his example and the planting of the seeds was accomplished in the same manner as described in Example 6. The data obtained are reported in Table II wherein the identification of the seeds is the same as that in the previous example and the herbicidal ratings given also have the same definition.

tion by the germinating seeds, emerging seedlings, or full grown plants. Thus, the herbicidal compositions of this invention include not only the concentrate compositions comprising the active ingredient and the herbicidal adjuvant but also herbicidal toxicant compositions in the field comprising the concentrate composition (i.e., active ingredient plus herbicidal adjuvant) and the carrier.

As demonstrated in the examples above, quite different effects can be obtained by modifying the method of use of the herbicidal composition of this invention. Thus, unusual grass specificity can be achieved at lower levels of application whereas at higher levels of application a more general herbicidal effect or soil sterilization takes place. Therefore, an essential part of this invention is the formulation of the herbicidal composition so as to permit a uniform predetermined application of the composition to the plant environment to produce the desired effect.

Herbicidal adjuvants useful in preparing the concentrate compositions and, therefore, the herbicidal toxicant compositions applied to the soil or plants, include particulate solid or liquid extending agents such as solvents or diluents within which the active ingredient is dissolved or suspended, wetting or emulsifying agents which serve in providing uniform dispersions or solutions of the active ingredient in the extending agents, and adhesive agents or spreading agents which improve the contact of the active ingredient with the soil or plant surfaces. All herbicidal compositions of this invention include at least TABLE II.—COMPARISON OF PRE-EMERGENCE HERBICIDAL ACTIVITY OF VARIOUS α-HALOACETAMIDES AND α-HALOACETANILIDES

| Compound | Plant type | | | | | | | | | | | | | | | Total injury rating | | Comments |
|---|---|---|---|---|---|---|---|---|---|---|---|---|---|---|---|---|---|---|
| | A | B | C | D | E | F | G | H | I | J | K | L | M | N | O | Grass | Broadleaf | |
| N-tert-butyl-2-chloro-N-cyclohexylacetamide | 3 | 0 | 1 | 2 | 1 | 3 | 1 | 0 | 3 | 3 | 2 | – | 0 | 0 | 3 | 15 | *4 | At 5 lb./acre. |
| N-tert-butyl-2-chloroacetanilide | 2 | 2 | 1 | 2 | 2 | 3 | 0 | 2 | 3 | 3 | 3 | 0 | 0 | 1 | 3 | 16 | 7 | Do. |
| N-(2'-tert-butylcyclohexyl)-2-chloroacetamide | 2 | 0 | 0 | 1 | 1 | 2 | 0 | 0 | 3 | 3 | 0 | 0 | – | 0 | 1 | 11 | *0 | At 1 lb./acre. |
| 2'-tert-butyl-2-chloroacetanilide | 1 | 0 | 0 | 0 | 0 | 0 | 0 | 0 | 0 | 3 | 0 | 0 | 0 | 0 | 0 | 3 | 0 | Do. |
| N-(2'-tert-butyl-6'-methylcyclohexyl)-2-chloroacetamide | 3 | 0 | 0 | 3 | 3 | 3 | 0 | 0 | 3 | 3 | 1 | 0 | 0 | 0 | 0 | 15 | 1 | Do. |
| 2'-tert-butyl-2-chloro-6'-methylacetanilide | 3 | 3 | 3 | 3 | 3 | 3 | 3 | 3 | 3 | 3 | 3 | 3 | 3 | 3 | 3 | 18 | 21 | Do. |
| N-(2'-tert-butyl-6'-ethylcyclohexyl)-2-chloroacetamide | 3 | 0 | 0 | 3 | 0 | 3 | 0 | 0 | 3 | 3 | 0 | 0 | 0 | 0 | 3 | 15 | 0 | At 5 lb./acre. |
| 2'-tert-butyl-2-chloro-6'-ethylacetanilide | 3 | 3 | 3 | 3 | 3 | 3 | 3 | 3 | 3 | 3 | 3 | – | 3 | 3 | 3 | 18 | *18 | Do. |
| 2-bromo-N-(2'-tert-butyl-6'-ethylcyclohexyl)acetanilide | 3 | 0 | 0 | 3 | 3 | 3 | 0 | 0 | 2 | 1 | 1 | 0 | 0 | 0 | 3 | 15 | 1 | At 1 lb./acre. |
| 2-bromo-2'-tert-butyl-6'-ethylacetanilide | 3 | 2 | 1 | 3 | 3 | 3 | 2 | 2 | 3 | 3 | 3 | 0 | 2 | 3 | 3 | 18 | 13 | Do. |
| N-(2-tert-butyl-6-methylcyclohexyl)chloroacetamide | 2 | 1 | 1 | 0 | 3 | 3 | 1 | 3 | 3 | 3 | 0 | 0 | 1 | 0 | 1 | 13 | 6 | At ¼ lb./acre. |
| N-cyclohexyl-N-allyl-α-chloroacetamide | 2 | 1 | 0 | 0 | 2 | 2 | 1 | 1 | 3 | 1 | 2 | 0 | 0 | 1 | 2 | 10 | 5 | At 1 lb./acre. |
| α-Chloro-N-cyclohexylacetamide | 2 | 0 | 0 | 1 | 1 | 1 | 0 | 1 | 3 | 3 | 1 | 0 | 0 | 0 | 0 | 9 | 2 | Do. |

*One species missing.

The comparisons in Table II demonstrate the improvement in selectivity obtained by substituting a cyclohexyl radical instead of an aromatic radical on the amide nitrogen atom of an acetamide. In each comparison the herbicidal activity of the cyclohexyl derivative is compared at the same rate of application with the benzene derivative having the same nitrogen or nuclear substitution. The general broadleaf rating of each cyclohexyl derivative was found to be 2 or 3 at the same rate of application. At the rates of application compared, the general grass ratings for both derivatives were either 2 or 3. Thus, the hydrogenated derivative of the α-haloacetanilides have unusual inherent selectivity not to be found in the α-haloacetanilides themselves. The last comparison demonstrates the unexpectedly superior activity of a compound of the invention as compared to the most closely related specific compound named in U.S. 3,007,786.

The herbicidal compositions of this invention are either particulate solid (i.e., dusts) or liquid concentrate compositions comprising the active ingredient and either a particulate solid or liquid herbicidal adjuvant which are formulation aids or conditioning agents permitting the concentrate composition to be readily mixed with a suitable solid or liquid carrier in the field for application of the active ingredient on soil or plant surfaces in a toxic concentration in a form which enables prompt assimilaone of the above types of herbicidal adjuvants and usually include an extending agent and a wetting or emulsifying agent because of the nature of the physical properties of the α-haloacetamides of this invention.

In general, the α-halacetamides of this invention are insoluble in water and are not readily soluble in many organic solvents. Therefore, the choice of a liquid extending agent is somewhat limited if it is desired that the active ingredient be in solution in the extending agent. The active ingredient need not be dissolved in the extending agent, but may merely be dispersed or suspended in the extending agent as a suspension or emulsion. Also, the α-haloacetamides may first be dissolved in a suitable organic solvent and the organic solution of the active ingredient then incorporated in water or an aqueous extending agent to form a heterogenous dispersion. Examples of some suitable organic solvents for use as extending agents include hexane, benzene, toluene, acetone, cyclohexanone, methylethylketone, isopropanol, butanediol, methanol, diacetone, alcohol, xylene, dioxane, isopropyl ether, ethylene dichloride, tetrachloroethane, hydrogenated naphthalene, solvent naphtha, petroleum fractions (e.g., those boiling almost entirely under 400° F. at atmospheric pressure and having flash points above about 80° F., particularly kerosene), and the like. Where true solutions are desired, mixtures of organic solvents have been found to be useful, for example, 1:1 and 1:2 mixtures of xylene and cyclohexanone.

Solid extending agents in the form of particulate solids are very useful in the practice of the present invention because of the low solubility properties of the α-haloacetamides of this invention. In using this type of extending agent, the active ingredient is either adsorbed or dispersed on or in the finely divided solid material. Preferably the solid extending agents are not hygroscopic but are materials which render the composition permanently dry and free flowing. Suitable solid extending agents include the natural clays, such as china clays, the bentonites and the attapulgites; other minerals in natural state, such as talc, pyrophyllite, quartz, diatomaceous earth, fuller's earth, chalk, rock phosphate, kaolin, kieselguhr, volcanic ash, salt and sulfur; the chemically modified minerals, such as acid-washed bentonite, precipitated calcium phosphate, precipitated calcium carbonate, calcined magnesia and colloidal silica; and other solid materials such as powdered cork, powdered wood, and powdered pecan or walnut shells. These materials are used in finally divided form, at least in a size range of 20–40 mesh and preferably in much finer size.

The particulate solid concentrate compositions are applied to the soil by admixture at the time of application with a particulate solid carrier material. If desired, this concentrate composition can also be applied as a wettable powder using a liquid carrier material. When used by this method, a wetting agent or surface active agent is added to the concentrate composition in order to render the particulate solid extending agent wettable by water to obtain a stable aqueous dispersion or suspension suitable for use as a spray. Also, the extending agent applied as a wettable powder is used in very finely divided form, preferably in a size as small as 100 mesh or smaller.

The surface active agent, that is the wetting, emulsifying or dispersion agent, used in the herbicidal composition of this invention to serve in providing uniform dispersions of all formulation components of both liquid and dust types in both the concentrate compositions and the toxicant compositions applied, may be either anionic, cationic, or non-ionic types, including mixtures thereof. Suitable surface active agents are the organic surface active agents capable of lowering the surface tension of water and include the conventional soaps, such as the water-soluble salts of long-chain carboxylic acids; the amino soaps, such as the amine salts of long-chain carboxylic acids; the sulfonated animal, vegetable and mineral oils; quaternary salts of higher molecular weight acids; rosin soaps, such as salts of abietic acid; sulfuric acid salts of high molecular weight organic compounds; algin soaps; ethylene oxide condensated with fatty acids, alkyl phenols and mercaptans; and other simple and polymeric compositions having both hydrophilic and hydrophobic functions.

The herbicidal concentrate compositions of this invention ordinarily have the active ingredient and the surface active agent present in higher concentrations than the toxicant compositions applied in the field so that upon dilution with the liquid or solid carrier, compositions containing optimum proportions of active ingredient and surface actve agent are prepared to obtain uniform distribution and to maintain the active ingredient in a form which enables the prompt, assimilation by the plant.

The liquid concentrate compositions of this invention preferably comprise 5% to 95% by weight of the active ingredient and the remainder the herbicidal adjuvant, which may be solely liquid extending agent or surface active agent (including adhesive agent), but preferably is a combination of liquid extending agent and surface active agent. Preferably, the surface active agent comprises from 0.1% to 15% by weight of the total concentrate composition. The remainder of the composition is the liquid extending agent.

Use of the surface active agent is necessary in the formulation of liquid concentrate compositions in order to obtain a composition containing a sufficient concentration of the difficultly soluble alpha-haloacetamide in the liquid extending agent. However, the liquid extending agent must be selected not only on the basis of the amount of the alpha-haloacetamide dissolved but also upon the basis of the solution temperature of the total composition. Thus, in some formulations, a particular combination of solvents give a sufficiently low solvent temperature but the amount of the alpha-haloacetamide dissolved or dispersed in the mixture is insufficient and a suitable surface active agent must be selected in order that more alpha-haloacetamide can be dispersed in the composition. Preferably, the concentrate composition has a solution temperature below 0° C. although compositions having solution temperatures as high as 20° C. can be used.

The concentration of alpha-haloacetamide in the particulate solid or dust concentrate composition of this invention may vary over wide ranges depending upon the nature of the solid extending agent and the intended use of the composition. Since the alpha-haloacetamide of this invention have very high toxicities and are applied at very low rates, the concentration of the active ingredient in the dust composition may be very low and may comprise as little as 1% or less by weight of the total dust composition; however, a concentration in the range of 5% to 98% by weight of the total composition is preferred. The remainder of the composition is the herbicidal adjuvant which is usually only the particulate solid extending agent. Thus, the surface active agent is not usually required in dust concentrate compositions although it can be used if desired. However, if the dust concentrate composition is to be applied as a wettable powder, surface active agent must be added to the concentrate composition and ordinarily the amount of surface active agent will be in the range of 0.1% to 15% by weight of the composition.

The carrier material, used for the uniform distribution of the alpha-haloacetamide in a herbicidally effective amount to inhibit the growth of either all or selected plants, may be either a liquid or a particulate solid material. The liquid and solid extending agents used to prepare the concentrate composition may also be used as the carrier; however, the use of these materials as a carrier is often not economical. Therefore, water is the preferred liquid carrier, both for use with the liquid concentrate composition and the wettable powder concentrate. Suitable particulate solid carriers include the particulate extending agents noted above as well as the solid fertilizers such as ammonium nitrate, urea, and superphosphate, as well as other materials in which plant organisms may take root and grow, such as compost, manure, humus, sand and the like.

The liquid and dust concentrate compositions of this invention can also contain other additaments such as fertilizer and pesticides. Also, these additaments may be used as, or in combination with, the carrier materials.

The herbicidal compositions of this invention are applied to the plant systems in the conventional manner. Thus, the dust and liquid compositions may be applied to the foliage of growing plants by the use of power-dusters, broom and hand sprayers, and spray-dusters. The compositions can also be very suitably applied from airplanes as a dust or a spray because the herbicidal compositions of this invention are effective in very low dosages. In order to prevent growth of germinating seeds or emerging seedlings, the dust and liquid compositions are applied to the soil according to conventional methods, and, preferably, distributed in the soil to a depth of at least ½ inch below the soil surface. It is not absolutely necessary that the herbicidal compositions be admixed with the soil particles and these compositions can be applied merely by spraying or sprinkling onto the surface of the soil. The herbicidal compositions of this invention can also be applied by addition to irrigation water supplied to the field to be treated. This method of application permits the penetration of the compositions into the soil as the water is absorbed therein. Dust compositions sprinkled on the surface of the soil can be distributed below the surface of the soil by the usual discing, dragging or mixing operations.

The application of a growth-inhibiting amount or toxic amount of the alpha-haloacetamide to the plant system is essential in the practice of the present invention. The exact dosage to be applied is dependent not only upon the specific alpha-haloacetamide but also upon the particular plant species to be controlled and the stage of growth thereof as well as the part of the plant to be contacted with the toxicant. These herbicidal compositions are usually applied at a rate in the range of 1 to 25 lbs. per acre or higher. It is believed that one skilled in the art can readily determine from this disclosure including the examples, the optimum rate to be applied in any particular case.

Although the active ingredient in the herbicidal compositions of this invention is preferably a substituted alpha-halo-N-cyclohexylacetamide as described in this specification, other alpha-haloacetamides having other nuclear alkyl and halo substitution and/or having no amide nitrogen substitution may also be present in the herbicidal compositions and contribute to the activity of the composition. However, the essential active ingredient of the herbicidal compositions of this invention in the substituted alpha-halo-N-cyclohexylacetamide disclosed in this specification. Of course, one skilled in the art will understand that mixtures of various substituted alpha-halo-N-cyclohexylacetamides can also be used.

Reasonable variation and modification of the invention as described are possible, the essence of which is that there have been provided (1) herbicidal concentrate compositions comprising a herbicidal adjuvant and, as an essential active ingredient, a substituted alpha-halo-N-cyclohexylacetamide, (2) herbicidal toxicant compositions comprising a herbicidal adjuvent, a carrier, and, as an essential active ingredient, a toxic or growth-inhibiting amount of a substituted alpha-halo-N-cyclohexylacetamide, (3) methods for suppression and control of undesirable vegetation, such as germinating seeds and emerging seedlings, by the application of a substituted alpha-halo-N-cyclohexylacetamide thereto, and (4) certain substituted alpha-halo-N-cyclohexylacetamides as new compounds.

What is claimed is:

1. A herbicidal concentrate composition comprising a herbicidal adjuvant and an effective amount of N-(2'-tert-butyl-6'-methylcyclohexyl)-2-chloroacetamide as active ingredient thereof.

2. A herbicidal concentrate composition comprising a herbicidal adjuvant and, as an essential active ingredient, an effective amount of N-(2'-tert-butyl-6'-methylcyclohexyl)-2-chloroacetamide.

3. A herbicidal toxicant composition comprising a herbicidal adjuvant, a carrier, and, as an essential active ingredient, a growth-inhibiting amount of N-(2'-tert-butyl-6'-methylcyclohexyl)-2-chloroacetamide.

4. A method for preventing plant growth which comprises applying to soils normally supporting said growth a growth-inhibiting amount or N-(2-tert-butyl-6'-methylcyclohexyl)-2-chloroacetamide.

5. A method for preventing the growth of undesirable plants which comprises distributing on the surface of soil containing seeds of said plants a growth-inhibiting amount of N-(2'-tert-butyl-6'-methylcyclohexyl)-2-chloroacetamide.

6. A method for preventing the growth of undesirable plants which comprises intimately admixing soil containing seeds of said plants with a growth inhibiting amount of N-(2'-tert-butyl-6'-methylcyclohexyl)-2-chloroacetamide.

7. A method for preventing the growth of undesirable plants which comprises contacting the seeds of said plants positioned in the soil with a growth-inhibiting amount of N-(2'-tert-butyl-6'-methylcyclohexyl)-2-chloroacetamide.

8. A method for preventing the growth of undesirable plants which comprises impregnating the soil with a growth-inhibiting amount of N-(2'-tert-butyl-6'-methylcyclohexyl)-2-chloroacetamide.

References Cited

UNITED STATES PATENTS 3,007,786  11/1961  Hamm et al. _____ 71—118

LEWIS GOTTS, *Primary Examiner.*

C. L. MILLS, *Assistant Examiner.*